(12) United States Patent
Pou et al.

(10) Patent No.: US 10,941,332 B2
(45) Date of Patent: Mar. 9, 2021

(54) ANTI-CORROSION FORMULATIONS WITH STORAGE STABILITY

(71) Applicant: Arkema France, Colombes (FR)

(72) Inventors: Tong Eak Pou, Irigny (FR); Denis Alonzo, Irigny (FR); Gilles Barreto, Messimy (FR); Kevin Hisler, Pau (FR)

(73) Assignee: Arkema France, Colombes (FR)

( * ) Notice: Subject to any disclaimer, the term of this patent is extended or adjusted under 35 U.S.C. 154(b) by 38 days.

(21) Appl. No.: 15/023,572

(22) PCT Filed: Sep. 23, 2014

(86) PCT No.: PCT/FR2014/052372
§ 371 (c)(1),
(2) Date: Mar. 21, 2016

(87) PCT Pub. No.: WO2015/044576
PCT Pub. Date: Apr. 2, 2015

(65) Prior Publication Data
US 2016/0230078 A1   Aug. 11, 2016

(30) Foreign Application Priority Data
Sep. 24, 2013 (FR) ..................................... 13.59145

(51) Int. Cl.
*C09K 8/54* (2006.01)
*C23F 11/16* (2006.01)

(52) U.S. Cl.
CPC .............. *C09K 8/54* (2013.01); *C23F 11/161* (2013.01); *C23F 11/165* (2013.01)

(58) Field of Classification Search
CPC .. C09K 8/54; C09K 8/52; C09K 8/528; C23F 11/161
USPC ...................................................... 507/130
See application file for complete search history.

(56) References Cited

U.S. PATENT DOCUMENTS

| 3,846,139 A | 11/1974 | Warner | |
| 3,899,293 A * | 8/1975 | Bush | C23F 11/08 252/389.22 |
| 5,834,416 A * | 11/1998 | Morgan | B01D 12/00 134/42 |
| 2006/0157387 A1 | 7/2006 | Humblot | |
| 2006/0175005 A1* | 8/2006 | Sawant | C08L 81/02 156/307.1 |
| 2008/0181813 A1* | 7/2008 | Greaves | C09K 8/54 422/7 |
| 2008/0194721 A1* | 8/2008 | Arney | B82Y 10/00 522/49 |
| 2010/0301275 A1* | 12/2010 | Babic-Samardzija | C23F 11/06 252/391 |

FOREIGN PATENT DOCUMENTS

| CN | 1820063 A | 8/2006 |
| CN | 101354543 | 1/2009 |
| FR | 2935972 | 3/2010 |
| GB | 2324084 | 10/1998 |
| JP | 07173675 | 7/1995 |
| WO | 9841673 | 9/1998 |
| WO | 0112878 | 2/2001 |
| WO | 2008091429 | 7/2008 |
| WO | 2010031963 | 3/2010 |
| WO | 2013034846 | 3/2013 |
| WO | 2013038100 | 3/2013 |

OTHER PUBLICATIONS

International Search Report for International Application for PCT/FR2014/052372, dated Mar. 31, 2015.

* cited by examiner

Primary Examiner — Aiqun Li
(74) Attorney, Agent, or Firm — RatnerPrestia

(57) ABSTRACT

The present invention concerns the use of at least one compound A comprising at least one —SH or —S⁻, M⁺ group, at least one —C-G-C— chain, in which G represents an atom from column 16 of the periodic table, not comprising a carboxy group —C(═O)—OH or —C(═O)—O⁻, and of a molar mass of between 90 g·mol⁻¹ and 1000 g·mol⁻¹, as an additive in a formulation inhibiting corrosion in metals used in the oil industry, and more generally in any kind of industry involving the drilling of ores or fossil compounds, such as gas or oil, in order to improve both the anti-corrosion performance and the storage stability of same. The invention also concerns said corrosion-inhibiting formulations comprising at least one compound A.

11 Claims, No Drawings

US 10,941,332 B2

ANTI-CORROSION FORMULATIONS WITH STORAGE STABILITY

CROSS-REFERENCE TO RELATED APPLICATIONS

This is the national phase of International Application No. PCT/FR2014/052372, filed 23 Sep. 2014, which claims priority from French Application No. 13.59145, filed 24 Sep. 2013. The disclosure of each of these applications is incorporated herein by reference in its entirety for all purposes.

FIELD OF THE INVENTION

The present invention relates to formulations which inhibition the corrosion of metals used in the oil and gas industry and more specifically in any type of industry for the drilling, completion, stimulation and production of ores or fossil compounds, such as gas, oil, asphalt and others.

BACKGROUND OF THE RELATED ART

Such corrosion-inhibiting formulations are already widely known and the most effective of them generally comprise one or more sulfur-based derivatives, in particular chosen from mercapto alcohols and mercapto acids. Thus, the applications WO 1998/041673, WO 2013/034846 and WO 2013/038100 describe corrosion-inhibiting formulations where the addition of sulfur-based derivatives, for example thioglycolic acid, makes it possible to enhance the performance of said inhibiting formulations. The application WO 2001/012878 A1 describes the use of mercapto alcohol with the same aim of improving the performance of corrosion-inhibiting formulations.

However, it has been observed that the corrosion-inhibiting formulations comprising one or more sulfur-based derivatives, such as those defined above and in particular thioglycolic acid, are not very stable on storage and have a tendency to develop nauseating and undesired odors.

These nauseating odors are probably due to the decomposition of the sulfur-based derivatives and, without being committed by the theory, it is believed today that the sulfur-based derivatives defined above, such as, for example, thioglycolic acid, the mercapto alcohol and others, probably decompose in part to give hydrogen sulfide ($H_2S$) at the storage temperature. The higher the storage temperature, the greater the decomposition of the sulfur-based derivatives, in particular when thioglycolic acid is concerned.

This decomposition phenomenon presents industrial health problems and thus renders these corrosion-inhibiting formulations difficult to use, due to the unpleasant odors which they release, indeed even odors which are dangerous to the users. This is because hydrogen sulfide is toxic, even at very low concentrations in air. Another problem related to the use of some of the sulfur compounds described above is their very high toxicity which makes them extremely dangerous to handle during the manufacture of said corrosion-inhibiting formulations.

The gas and oil industry already uses certain compounds, referred to as $H_2S$ scavengers, where they are mainly employed by injection into gas, crude oil or water or aqueous fluid pipes, in order to scavenge (trap, or also neutralize) the acidic entities present in said pipes. These acidic entities, which are often corrosive, are mainly due to the presence of moisture and of "sour" gases, such as, for example, hydrogen sulfide ($H_2S$) and carbon dioxide ($CO_2$) in the presence of $H_2S$.

In this field, it is today commonly established to classify $H_2S$ scavengers into two major families, regenerative scavengers and non-regenerative scavengers.

Mention may be made, among "regenerative" $H_2S$ scavengers, for example, of alkanolamines, such as monoethanolamine, diethanolamine or also methylethanolamine.

Mention may be made, among "non-regenerative" $H_2S$ scavengers, for example, of triazines and their derivatives, oxidizing agents, such as chlorine dioxide, hypochlorites (for example bleach) or hydrogen peroxide, transition metal salts (such as iron, cobalt, nickel, chromium, copper, zinc or manganese salts, and the like) or aldehydes, such as formaldehyde and glyoxal.

It might thus be envisaged to use such $H_2S$ scavengers in order to trap the sulfides resulting from the decomposition of the sulfur-based derivatives present in corrosion-inhibiting compositions. However, the majority of the regenerative scavengers and non-regenerative scavengers suffer from many drawbacks which render them not very suitable for use in corrosion-inhibiting formulations.

Thus, amine-based derivatives, in particular alkanolamines, are not efficient enough in removing the $H_2S$ resulting from the decomposition of thioglycolic acid. Oxidizing agents, such as chlorine dioxide, bleach or aqueous hydrogen peroxide solution, are difficult to use because of their corrosiveness, which conflicts with the desired aim.

In addition, the formation of insoluble solids with some of these $H_2S$ scavengers and thioglycolic acid in anticorrosion formulations renders these formulations unsuitable for use, since any risk of blocking and clogging of the injection tubes and pipes must be avoided at all costs. Furthermore, aldehydes, such as formaldehyde and glyoxal, are toxic and it is sought to minimize, indeed even avoid, their use.

Furthermore, while these $H_2S$ scavengers are generally effective in trapping the hydrogen sulfide present in gas, crude oil or water or aqueous fluid pipes, in order to scavenge (trap, or also neutralize) the acidic entities present in said pipes, it is not established that these $H_2S$ scavengers might be effective in stabilizing corrosion-inhibiting formulations and preventing their decomposition in order to avoid the release of $H_2S$.

Moreover, the addition of such an $H_2S$ scavenger to corrosion-inhibiting formulations would correspond to an additional stage during the preparation of such formulations and would thus result in an increase in the manufacturing and sales costs of these formulations.

There consequently remains a need for formulations which are effective from the viewpoint of the inhibition of corrosion, comprising at least one sulfur-based compound which makes it possible to enhance the performance of said inhibiting formulations, which are not or only slightly toxic and/or harmful, which are stable on storage and which are easy and economically possible to prepare.

Thus, one objective of the present invention is to make available anti-corrosion formulations comprising at least one sulfur-based derivative and which are stable on storage, that is to say which do not generate or which generate little in the way of unpleasant odors over time. Another objective of the present invention is to make available stable anti-corrosion formulations which are particularly suitable and effective for the prevention and treatment of corrosion in the field of oil or gas extraction and the extraction of ores in general.

Another objective of the invention is to make available stable anti-corrosion formulations which are suitable and effective for the prevention and treatment of corrosion in the field of oil or gas extraction and the extraction of ores, said formulations being non-toxic or not very toxic, that is to say comprising no or very little in the way of compounds which might prove to be toxic, harmful and/or environmentally unfriendly, or not decomposing to give toxic, harmful and/or environmental unfriendly compounds during storage of said formulations over time.

SUMMARY OF THE INVENTION

The inventors have now discovered that the abovementioned objectives are achieved, in all or at least in part, by virtue of the formulations according to the invention as will be set out in the description which follows. Yet other objectives will become apparent in this same description.

Thus, the anti-corrosion formulations according to the present invention comprise at least one specific sulfur-based compound which can advantageously replace the sulfur-based compounds commonly used in such corrosion-inhibiting compositions and which are well known from the prior art. These specific sulfur-based compounds confer a better stability on storage on said formulations, the amount of $H_2S$ released during storage is lowered and the corrosion-inhibiting performances are at least of the same level, indeed even of a higher level, in comparison with the corrosion-inhibiting formulations used today but which have proven to be unstable on storage.

Thus, and according to a first aspect, the present invention relates to the use, as additive in a corrosion-inhibiting formulation in order to improve both the anti-corrosion effectiveness and the stability on storage thereof, of at least one compound A exhibiting at least the following characteristics:

the compound A carries at least one —SH or —S$^-$M$^{p+}$ group, where M$^{p+}$ represents a cation of an alkali metal (Group 1) or of an alkaline earth metal (Group 2), or of a metal of Groups 7, 8, 9, 10, 11 or 12 of the Periodic Table of the Elements, p representing the valency of said metal and being able to take the value 1, 2 or 3, the compound A comprises at least one —C-G-C— sequence, where G represents an atom of Group 16 of the Periodic Table of the Elements, and G preferably represents the oxygen atom or the sulfur atom, the compound A does not comprise a carboxyl —C(=O)—OH or —C(=O)—O$^-$ group, and the molar mass of the compound A is between 90 g·mol$^{-1}$ and 1000 g·mol$^{-1}$, preferably between 200 g·mol$^{-1}$ and 1000 g·mol$^{-1}$, limits included.

DETAILED DESCRIPTION OF CERTAIN EMBODIMENTS OF THE INVENTION

According to a preferred aspect, M$^{p+}$ represents an alkali metal cation chosen from sodium or potassium and in this case p represents 1, or an alkaline earth metal cation chosen from calcium or magnesium and in this case p represents 2, or a cation of a metal of Groups 10, 11, or 12 of the Periodic Table of the Elements chosen from zinc (p=2) or copper (p=1 or 2).

It should be understood that the compound A is electronically neutral, that is to say that the number of —S$^-$ groups per M$^{p+}$ cation is equal to the number p, the valency of the metal counterion in the compound A.

The compounds A are either known compounds which are commercially available or compounds which can be easily prepared from procedures known from the scientific literature, from the patent literature, from Chemical Abstracts or from the Internet, or also by adapting the abovementioned procedures.

The compound A is thus a molecule of moderate size, carrying at least one thiol or thiolate functional group, carrying a heteroatom of Group 16 of the Periodic Table connected to two carbon atoms and not comprising a carboxylic acid or carboxylic acid salt functional group.

According to a first preferred embodiment of the invention, the compound A is a mercapto ether of formula A1:

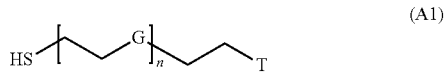

(A1)

in which:

G represents an atom of Group 16 of the Periodic Table of the Elements, and G preferably represents the oxygen atom or the sulfur atom, T represents the —OH radical or the —SH radical; preferably, T represents the —SH radical, and n represents an integer taking the values from 1 to 10, limits included, preferably from 1 to 6, limits included; preferably, n represents 1, 2, 3 or 4.

The compounds of formula A1, for which G represents the oxygen atom are very particularly preferred. The compounds of formula A1, for which T represents the —SH radical are also preferred.

According to a very particularly preferred aspect of the present invention, the compound of formula A1 corresponds to the formula A1n:

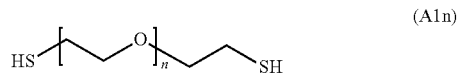

(A1n)

in which n represents an integer taking the values from 1 to 10, limits included, preferably from 1 to 6, limits included; preferably, n represents 1, 2, 3 or 4.

The compound of formula A1n in which n represents 1 is 2-mercaptoethyl ether, subsequently denoted by MEE. The compound of formula A1n in which n represents 2 is 2,2'-(ethylenedioxy)diethanethiol or 1,8-dimercapto-3,6-dioxaoctane, better known under the acronym DMDO and sold by Arkema. The compound of formula A1n in which n represents 3 is 1,11-dimercapto-3,6,9-trioxaundecane.

Some compounds of formula A1n defined above are known from the publication CN101354543 as corrosion inhibitors in formulations intended to remove protective films during the preparation of copper-based printed circuits. This publication neither teaches nor suggests the use of these compounds of formula A1n as additive in a formulation itself corrosion-inhibiting in order to improve the anticorrosion effectiveness thereof. Likewise, this publication neither teaches nor suggests that these compounds are stable on storage and in particular that they do not generate nauseating odors, such as those, for example, those due to a release of hydrogen sulfide.

Other compounds A which can be used in the context of the present invention are alk(en)yl thioglycolates, in which the alk(en)yl group comprises from 1 to 20 carbon atoms, and is preferably chosen from methyl, ethyl, prop(en)yls, but(en)yls, pent(en)yls, hex(en)yls, hept(en)yls, oct(en)yls, non(en)yls, dec(en)yls, undec(en)yls, dodec(en)yls, hexadec(en)yls, heptadec(en)yls and octadec(en)yls.

Other compounds A which can also be used in the context of the present invention are the sulfur-based derivatives of the triglycidyl ether and for example the mercaptoethyl derivatives of the triglycidyl ether of trimethylolpropane, in particular the compound of formula $C_2H_5C[CH_2OCH_2CH(OH)CH_2SH]_3$.

Yet other compounds A comprise benzothiazole derivatives, for example sodium mercaptobenzothiazolate (CAS No.: 2492-26-4) sold by Ceca S.A. under the brand name Norust® GL 50.

The compounds A as just defined are particularly effective as additives in the anti-corrosion formulations for the metals used in the oil and gas industry and more specifically in any type of industry for the drilling, completion, stimulation and production of ores or fossil compounds, such as gas, oil, asphalt and others. These compounds A make it possible for said anti-corrosion formulations to be stable during their storage but also make it possible to advantageously replace the sulfur-based derivatives generally present in said anti-corrosion formulations with the aim of further improving the effectiveness thereof.

According to a second aspect, the present invention relates to a corrosion-inhibiting formulation comprising:
a) at least one amine or amine derivative,
b) at least one compound A defined above, and
c) optionally a solvent or a mixture of two or more solvents.

The corrosion-inhibiting formulation according to the invention can thus comprise a solvent or a mixture of two or more solvents, the solvent or solvents preferably being chosen from water and water-soluble organic solvents, in particular organic solvents of alcohol and/or glycol type.

Generally:
the component a) represents from 40% to 99.5% by weight, preferably from 55% to 85% by weight and more preferably from 55% to 75% by weight, limits included, with respect to the total weight of the components a)+b)+c),
the component b) represents from 0.5% to 30% by weight and preferably from 2% to 20% by weight, limits included, with respect to the total weight of the components a)+b)+c),
the component c) represents from 0% to 59.5% by weight, preferably from 20% to 59% by weight and more preferably from 30% to 59% by weight, limits included, with respect to the total weight of the components a)+b)+c).

The components a) of the formulations of the present invention are the nitrogen-based derivatives commonly used as corrosion inhibitors in the oil and gas industry.

Mention may be made, among these components a), as nonlimiting examples, of amines, ethoxylated amines, amino acids, imidazolines, and also their derivatives and their salts, in particular the alkyl-imidazo-polyethyleneamines described in the application WO 1998/041673, the imidazoline-amine carboxylates described in the application WO 2010/031963, quaternary alkylimidazolines or alkoxylated alkylimidazolines, fatty amines, fatty amine derivatives (amino acids, amino alcohols, amidoamines, ammoniums, quaternary ammoniums, pyridines and derivatives, such as, for example, pyridiniums, or quinolines and derivatives, such as, for example, quinoliniums), imidazolines substituted by at least one fatty chain, alkoxylated imidazolines, ester amines, the ether amines described in the application WO 2013/034846, or MOPA (3-methoxypropylamine), EDIPA (N,N-diisopropylethylamine), the alkylamines described in the application WO 2013/038100, and also oxyalkylated amines (for example oxyethylated and/or oxypropylated and/or oxybutylated), such as, for example, the Noramox® products and in particular Noramox® C11, which are sold by Ceca S.A, betaines and alkyl betaines, the N-oxide derivatives of the abovementioned amines, and also the mixtures of two or more of the above compounds, such as those sold by Ceca S.A. under the trade names Norust® 97 BX, Norust® 103, Norust® 575, Norust® 740, Prochinor® IC 32, Prochinor® IC 1950, and others.

As indicated above, the corrosion-inhibiting formulations known to date and which contain at least one sulfur-based compound, in particular those containing thioglycolic acid, have often proved to be unstable over time (in particular during a storage test at 60° C. for 8 days), insofar as they were accompanied by a strong odor which can be related to a significant release of $H_2S$ (greater than approximately 70 ppm). Due to this strong release of gaseous $H_2S$ and the toxicity of this gas, these corrosion-inhibiting formulations cannot be used without appropriate protection.

Thus, the partial or complete suppression of the sulfur-based agents known to date and the addition of at least one compound A (component b)) in these formulations makes possible better stability over time and a virtually complete absence of release of an unpleasant odor, in particular a virtually complete absence of release of $H_2S$.

Mention may be made, among the components c) of the formulations according to the present invention, as nonlimiting examples, of water and organic solvents, and also the mixtures of water with at least one organic solvent. The organic solvents which can be used are preferably water-soluble organic solvents and can, for example, be chosen from alcohols and ethers and more particularly from alkanols and glycols, more particularly methanol, ethanol, glycol, monoethylene glycol (MEG), diethylene glycol (DEG), triethylene glycol (TEG), 2-butoxyethanol and the mixtures of two or more of them in all proportions.

The formulations according to the present invention can also comprise, although this is not preferred, one or more other compounds carrying at least one sulfur atom and at least one, preferably at least two, carbon atom(s). Mention may be made, among these compounds, in particular and as nonlimiting examples, of the alcohols and acids comprising at least one sulfur atom, in addition particularly mercaptoethanol, mercaptopropanol, thioglycolic acid, mercaptoacetic acid or mercaptopropionic acid, to mention only the most readily available among them, thioglycolic acid (TGA) being very particularly preferred, the TGA combination being very particularly advantageous. This is because, as DMDO is stable at high temperature (150° C.) and TGA exhibits a degree of instability even at ambient temperature, such a combination exhibits a very particularly advantageous interest in terms of stability and anticorrosion power.

The corrosion-inhibiting formulation according to the present invention can also comprise one or more $H_2S$ scavengers and advantageously those chosen from regenerative scavengers and non-regenerative scavengers, preferably at least one non-regenerative scavenger, more preferably chosen from triazines and their derivatives, oxidizing agents, such as chlorine dioxide, hypochlorites (for example bleach) or hydrogen peroxide, transition metal salts (such as iron, cobalt, nickel, chromium, copper, zinc or manganese salts and the like) or aldehydes, such as formaldehyde and glyoxal.

The amount of $H_2S$ scavenger(s) and in particular of compound(s) carrying at least one triazine unit in the corrosion-inhibiting formulation of the present invention can vary within wide proportions, according to the nature and the amount of the other components present in said formulation, and is generally between 0.5% and 10% by weight, preferably between 0.5% and 5% by weight, for example approximately 2% by weight, with respect to the total weight of the formulation.

The formulations according to the present invention can additionally comprise one or more other additives, fillers, and the like, which are inert with respect to the effectiveness of the corrosion-inhibiting activity and which are well known to a person skilled in the art in the field of the extraction of hydrocarbons and other fossil or mineral ores. Mention may be made, among these additives, without implied limitation, of stabilizers, preservatives, UV stabilizers, flame retardants, colorants, other $H_2S$ scavengers (as defined above, such as aldehydes, for example and without implied limitation formaldehyde or glyoxal) and the like.

The amount of this/these additive(s) added can vary within wide proportions, according to the effect desired, the regulations in force, the required conditions of solubility or of compatibility, and the like. As a general rule, this amount varies from a few ppm by weight to a few percent by weight, with respect to the total weight of the formulation of the invention.

According to yet another aspect, the compositions of the present invention as just defined can be used alone, in combination, or as a mixture or as a formulation with one or more other inhibitors intended to inhibit other types of corrosion encountered in the field of the extraction of hydrocarbons, for example corrosion encountered during the reinjection of water, hydraulic fracturing, acidification or drilling, such as, for example, acetylenic alcohols, or alternatively intended to inhibit the formation of hydrates or their agglomeration, to avoid or prevent the appearance of scale, to avoid or prevent the growth of bacteria, to promote flow, and the like.

The amount of this or these other inhibitor(s) added can vary within wide proportions, according to the effect desired, the regulations in force, the required conditions of solubility or of compatibility, and the like. As a general rule, this amount varies from 0.1% to 60% by weight, generally from 0.5% to 40% by weight and preferably from 1% to 20% by weight, with respect to the total weight of the formulation. These proportions can, however, be different depending on the inhibiting effect desired and, for example, for the inhibitors which make it possible to avoid the formation or the agglomeration of hydrates, the proportion of the weight of said hydrate inhibitors to the weight of the components a), b) and c) and optionally d) can reach a ratio by weight of 30 000 for 10.

According to an embodiment of the present invention, the corrosion-inhibiting formulations comprise at least one mineral scale-inhibiting composition, said scale-inhibiting composition comprising, for example and without implied limitation, at least one compound chosen from acidic or neutralized aminophosphonates, poly(acrylic acids), poly (alkyl acrylates), copolymers based on phosphinocarboxylic acids, tannins, lignosulfonates, polyacrylamides, naphthalenesulfonates, and the like, as described, for example, in the application WO 2013/034846.

The anti-corrosion formulations according to the invention can be prepared by any known means and generally by simple mixing of the various components of said compositions in any order.

By virtue of the present invention, it is now possible to have available corrosion-inhibiting formulations comprising a sulfur-based product which are stable on storage, which do not develop nauseating odors on storage and which do not release toxic gas, in particular $H_2S$. In addition, the anti-corrosion performance of the corrosion-inhibiting formulations according to the invention is improved, in comparison with the corresponding formulations commonly used and known to date to a person skilled in the art.

Thus, and according to yet another aspect, the present invention relates to the use of at least one corrosion-inhibiting formulation according to the invention in the treatment, advantageously the preventive treatment, of the corrosion of metal pipes corrodible in contact with corrosive media in the oil, gas and mining industry.

This is because, during the extraction of hydrocarbons (or production of hydrocarbons), more particularly during the extraction of crude oil or the extraction of gas from subsurface layers, indeed even of ores, water and gases are generally produced simultaneously with the hydrocarbons or the ores and are raised to the surface. The presence of water, in more or less large amounts, is thus inherent to the extraction of underground hydrocarbons and ores and is the cause of numerous problems which disrupt the production lines.

This is because this presence of water, in particular in the presence of the gases extracted, is very often responsible for the corrosion of the pipes, pipework, tubes, valves and other metal components. In addition, in some cases, this water is reinjected into the subsurface layers as extraction aid.

The corrosion-inhibiting formulations according to the present invention thus have an entirely advantageous use in all the fields of the oil and gas industry and more specifically in any type of industry for the drilling, completion, stimulation and production of ores or fossil compounds, such as gas, oil, asphalt and the like, such as, for example and without implied limitation, in the techniques of drilling, of fracturing by fluid injection, of acidification of reservoirs of fossil compounds, of injection of fluids into subsurface reservoirs containing fossil compounds, and also in the techniques for their enhanced production and recovery.

These formulations can be injected according to any method well known to a person skilled in the art, continuously, batchwise or by the squeeze method, preferably continuously, into the extraction lines, into the lines for the injection of production waters and generally into any aqueous, organic or aqueous/organic fluid employed in the extraction fields. It is also possible, for example, to inject these formulations via the gas-lift system well known to a person skilled in the art.

The amount of corrosion-inhibiting formulation(s) according to the invention injected can vary within wide proportions, according to the requirements and the nature and the composition of the products extracted. As a general rule, the amount injected is between 1 ppm and 1000 ppm, preferably between 50 ppm and 800 ppm, where "ppm" represents parts by weight of corrosion-inhibiting formulation(s) per one million parts by volume of aqueous, organic or aqueous/organic fluid to be treated.

The corrosion-inhibiting formulation according to the invention is effective with regard to all the corrodible metals present in the abovementioned fields of the industry for the drilling, completion, stimulation and production of ores or fossil compounds. The corrosion-inhibiting formulation of the invention has proved to be particularly effective in the inhibition of the corrosion of steels of all types and in particular alloyed steels, very particularly alloys with nickel, chromium, molybdenum, silicon, titanium and vanadium, but also martensitic and austenitic stainless steels, and the like.

The following nonlimiting examples make it possible to illustrate and to better understand the invention, without limiting the scope thereof.

EXAMPLES

Measurement Methods

Measurement of the Amount of $H_2S$ Released 50 ml of corrosion-inhibiting formulation to be tested are introduced into a 100 ml flask. The flask is hermetically closed and stored at 60° C. for eight days. The amount of $H_2S$ released is subsequently measured by withdrawing a sample of gas phase using a pump provided with a Drager tube. The gas passes through the tube, the changing color of which indicates the amount of $H_2S$ released.

Measurement of the Rate of Corrosion

The anti-corrosion effectiveness is expressed in the form of rate of corrosion of a carbon steel as a function of time. The rate of corrosion is determined by the "LPR" (Linear Polarization Resistance) method by using a system comprising three electrodes, a carbon steel working electrode, a saturated calomel reference electrode and a platinum counterelectrode. These three electrodes are placed in a jacketed glass corrosion cell containing 700 ml of corrosive medium, deaerated beforehand by sparging with nitrogen, and then the cell is saturated by sparging with $CO_2$. The sparging with $CO_2$ is maintained throughout the duration of the experiment.

The effectiveness of the corrosion inhibitor is expressed as percentage of effectiveness, according to the following relationship:

$$\% \text{ EFF (CI)} = \frac{[(\text{Rcor}_1) - (\text{Rcor}_2)]}{(\text{Rcor}_1)} \times 100$$

where: % Eff (CI) represents the percentage of effectiveness of the anti-corrosion formulation, Rcor1 represents the rate of corrosion in the absence of anti-corrosion formulation and Rcor2 represents the rate of corrosion in the presence of anti-corrosion formulation.

The rates of corrosion in the absence and in the presence of anti-corrosion formulation are measured and monitored as a function of time using a Gamry potentiostat. In the presence of corrosion inhibitor, the lower the rate of corrosion, the more effective the inhibitor.

Example 1

Tests on a Corrosion-Inhibiting Formulation (Reference 1)

The working temperature is 80° C. The tests are carried out by introducing 25 ppm (weight/volume) of corrosion-inhibiting formulation. The corrosive medium is a synthetic 1 g.l$^{-1}$ sodium chloride (NaCl) solution, that is to say a solution of the same composition as the water of the site where there is corrosion. This medium is saturated by sparging with $CO_2$ throughout the experiment. The working temperature is 80° C.

The anti-corrosion formulations tested are described in detail in the following table 1, where the percentages are expressed by weight:

TABLE 1

| Formulation | Ref. R1 without TGA | Ref. R1 + TGA | Ref. R1 + DMDO | Ref. R1 + MEE | Ref. R1 + Norust ® GL 50 |
|---|---|---|---|---|---|
| Norust ® 97 BX formulated without TGA | 100 | 95 | 95 | 95 | 95 |
| Thioglycolic acid | — | 5 | — | — | — |
| DMDO | — | — | 5 | — | — |
| MEE | — | — | — | 5 | — |
| Norust ® GL 50 | — | — | — | — | 5 |

The results of the test of stability on storage ($H_2S$ release) and of the test of anti-corrosion effectiveness are presented in the following table 2:

TABLE 2

| Formulation tested | Amount of $H_2S$ released (ppm) | Anti-corrosion effectiveness (%) |
|---|---|---|
| Ref. R1 without TGA | 0 | 38 |
| Ref. R1 + TGA | >200 | 96 |
| Ref. R1 + DMDO | 2 | 98 |
| Ref. R1 + MEE | 20 | 96 |
| Ref. R1 + Norust ® GL 50 | 0 | 96 |

These results show that the corrosion-inhibiting formulation not containing a sulfur-based compound (Reference 1) exhibits only a low effectiveness against corrosion which is entirely inadequate. This same formulation containing thioglycolic acid is, for its part, effective from the viewpoint of corrosion but is highly unstable and releases a large amount of $H_2S$.

On the other hand, the formulations according to the invention (Reference 1+compound A) exhibit not only an anti-corrosion effectiveness entirely comparable to that containing thioglycolic acid but also prove to be very stable, with very low, indeed even zero, amounts of hydrogen sulfide released.

Example 2

Tests on a Corrosion-Inhibiting Formulation (Reference 2)

A new series of tests, as described in example 1 above, is carried out starting from the anti-corrosion formulations described in detail in the following table 3, where the percentages are expressed by weight:

TABLE 3

| Formulation | Ref. R2 without TGA | Ref. R2 + TGA + NaTG | Ref. R2 + DMDO | Ref. R2 + MEE | Ref. R2 + Norust ® GL 50 |
|---|---|---|---|---|---|
| Prochinor ® IC 1950 formulated without TGA | 100 | 80 | 80 | 80 | 80 |
| TGA + sodium thioglycolate | — | 20 | | | |
| DMDO | — | — | 20 | — | — |
| MEE | — | — | — | 20 | — |
| Norust ® GL 50 | — | — | — | — | 20 |

The results of the test of stability on storage (H₂S release) and of the test of anti-corrosion effectiveness are presented in the following table 4:

TABLE 4

| Formulation tested | Amount of H₂S released (ppm) | Anti-corrosion effectiveness (%) |
|---|---|---|
| Ref. R2 without TGA | 0 | 47 |
| Ref. R2 + TGA + NaTG | >200 | 97 |
| Ref. R2 + DMDO | 0 | 99 |
| Ref. R2 + MEE | 0 | 97 |
| Ref. R2 + Norust ® GL 50 | 0 | 97 |

These results also show that the corrosion-inhibiting formulation not containing a sulfur-based compound (Reference 2) exhibits only a low effectiveness against corrosion which is entirely inadequate. This same formulation containing thioglycolic acid is, for its part, effective from the viewpoint of the corrosion but is highly unstable and releases a large amount of H₂S.

On the other hand, the formulations according to the invention (Reference 2+compound A) exhibit not only an anti-corrosion effectiveness entirely comparable to that containing thioglycolic acid but also prove to be very stable, with an absence of release of hydrogen sulfide.

Example 3

Tests Based on a 2-in-1 Anti-Corrosion and Mineral Scale-Inhibiting Formulation

Another series of tests is carried out starting from a 2-in-1 (anti-corrosion+scale-inhibiting) formulation. The working temperature is 80° C. The tests are carried out by introducing 50 ppm (weight/volume) of corrosion-inhibiting formulation to be tested into a corrosive medium capable of generating scale, with the following composition saturated by sparging with CO₂ throughout the experiment:

| | amount in g · l⁻¹ |
|---|---|
| SrCl₂•6H₂O: | 0.47 |
| BaCl₂•2H₂O: | 0.27 |
| MgCl₂•6H₂O: | 25.65 |
| KCl: | 0.63 |
| CaCl₂•2H₂O: | 4.09 |
| NaHCO₃: | 1.42 |
| NaCl: | 94.08 |

The anti-corrosion/scale-inhibiting formulations tested are described in detail in the following table 5, where the percentages are expressed by weight:

TABLE 5

| Formulation | Ref. R3 | Ref. R3 + TGA | Ref. R3 + DMDO | Ref. R3 + MEE | Ref. R3 + Norust ® GL 50 |
|---|---|---|---|---|---|
| Prochinor ® IC 32 | 4.5 | 4.5 | 4.5 | 4.5 | 4.5 |
| Norust ® 103 | 12.0 | 12.0 | 12.0 | 12.0 | 12.0 |
| Norust ® 575 | 4.5 | 4.5 | 4.5 | 4.5 | 4.5 |
| Inipol AD ® 425C | 18.0 | 18.0 | 18.0 | 18.0 | 18.0 |
| Thioglycolic acid | — | 4.5 | — | — | — |
| DMDO | — | — | 4.5 | — | — |
| MEE | — | — | — | 4.5 | — |
| Norust ® GL 50 | — | — | — | — | 4.5 |
| Organic solvent | q.s. for | q.s. for | q.s. for | q.s. for | q.s. for | where Inipol ® AD 425C is a scale-inhibiting additive sold by CECA, and "q.s. for" means "amount sufficient to reach 100%".

The results of the test of stability on storage (H₂S release) and of the test of anti-corrosion effectiveness are presented in the following table 6:

TABLE 6

| Formulation tested | Amount of H₂S released (ppm) | Anti-corrosion effectiveness (%) |
|---|---|---|
| Ref. R3 | 0 | 82 |
| Ref. R3 + TGA | >200 | 98 |
| Ref. R3 + DMDO | 2 | 99 |
| Ref. R3 + MEE | 20 | 98 |
| Ref. R3 + Norust ® GL 50 | 0 | 99 |

Here again, the results show that the corrosion-inhibiting formulation not containing a sulfur-based compound (Reference 3) exhibits a low anti-corrosion effectiveness. This same formulation containing thioglycolic acid is, for its part, effective from the view point of the corrosion, but is highly unstable and releases a large amount of H₂S.

On the other hand, the formulations according to the invention (Reference 3+compound A) exhibit not only an anti-corrosion effectiveness entirely comparable to that containing thioglycolic acid but also prove to be very stable, with very low, indeed even zero, amounts of hydrogen sulfide released.

The results of the tests presented above thus show the very great advantages introduced by the addition, to a corrosion-inhibiting composition, of at least one compound A, simultaneously as regards the stability of said formulation, which releases only very little, indeed even no, hydrogen sulfide, its low toxicity and its very high anti-corrosion effectiveness, entirely comparable to the equivalent formulations containing thioglycolic acid, which are unstable and release hydrogen sulfide and which thus exhibit a not insignificant toxicity.

The invention claimed is:

1. A method of improving both the anti-corrosion effectiveness and stability on storage of a corrosion-inhibiting formulation, comprising:
   (a) combining a corrosion-inhibiting formulation with an effective amount of at least one compound A represented by formula A1n:

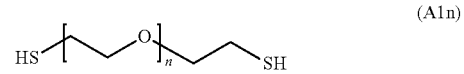

(A1n)

in which n represents an integer having a value of 2, 3 or 4; and
   (b) contacting the corrosion inhibiting formulation from (a) with at least one metal pipe, pipework, tube, valve or other metal component, wherein the compound A improves both the anti-corrosion effectiveness and the stability on storage of the corrosion-inhibiting formulation, and wherein the at least one metal pipe, pipework, tube, valve or other metal component is subsequently contacted with underground hydrocarbons and/or ores.

2. The method as claimed in claim 1, wherein the compound A is selected from the group consisting of 1,8-dimercapto-3,6-dioxaoctane and 1,11-dimercapto-3,6,9-trioxaundecane.

3. The method as claimed in claim 1, wherein the molar mass of the compound A is between 200 g·mol$^{-1}$ and 1000 g·mol$^{-1}$, limits included.

4. The method as claimed in claim 1, wherein n represents 2 or 3.

5. The method as claimed in claim 1, wherein the compound A is 1,8-dimercapto-3,6-dioxaoctane.

6. The method as claimed in claim 1, wherein the corrosion inhibitor is an amine or amine derivative.

7. The method as claimed in claim 1, wherein the corrosion inhibitor is selected from the group consisting of amines, ethoxylated amines, amino acids, imidazolines, and also their derivatives and their salts, fatty amines, fatty amine derivatives, imidazolines substituted by at least one fatty chain, alkoxylated imidazolines, ester amines, ether amines, alkylamines, oxyalkylated amines, betaines and alkylbetaines, and the N-oxide derivatives thereof.

8. The method as claimed in claim 1, wherein the corrosion inhibitor is an amine.

9. The method as claimed in claim 1, wherein the formation of $H_2S$ is at least partially suppressed.

10. The method as claimed in claim 1, wherein the formation of $H_2S$ is completely suppressed.

11. The method as claimed in claim 1, comprising contacting the corrosion inhibiting formulation from (a) with the at least one metal pipe.

* * * * *